US012233829B2

(12) United States Patent
Milanesi

(10) Patent No.: US 12,233,829 B2
(45) Date of Patent: Feb. 25, 2025

(54) SYSTEM AND METHOD FOR DETERMINING A BRAKING TORQUE BY MEANS OF A FORCE DETECTION DEVICE AT AN INTERFACE BETWEEN A BRAKE CALIPER BODY AND A HUB HOLDER

(71) Applicant: BREMBO S.p.A., Curno (IT)

(72) Inventor: Andrea Milanesi, Curno (IT)

(73) Assignee: Brembo S.p.A., Bergamo (IT)

( * ) Notice: Subject to any disclaimer, the term of this patent is extended or adjusted under 35 U.S.C. 154(b) by 155 days.

(21) Appl. No.: 17/757,849

(22) PCT Filed: Dec. 21, 2020

(86) PCT No.: PCT/IB2020/062288
§ 371 (c)(1),
(2) Date: Jun. 22, 2022

(87) PCT Pub. No.: WO2021/130655
PCT Pub. Date: Jul. 1, 2021

(65) Prior Publication Data
US 2023/0339446 A1  Oct. 26, 2023

(30) Foreign Application Priority Data
Dec. 23, 2019 (IT) .......................... 102019000025372

(51) Int. Cl.
*F16D 65/00* (2006.01)
*B60T 8/52* (2006.01)
(Continued)

(52) U.S. Cl.
CPC ................ *B60T 17/22* (2013.01); *B60T 8/52* (2013.01); *F16D 65/0062* (2013.01); *F16D 2055/0008* (2013.01); *F16D 2066/005* (2013.01)

(58) Field of Classification Search
CPC ........ B60T 17/22; B60T 8/52; F16D 65/0062; F16D 2055/0008
See application file for complete search history.

(56) References Cited

U.S. PATENT DOCUMENTS 11,815,145 B2 * 11/2023 Huschenhoefer ....... F16D 66/00
2008/0078629 A1 * 4/2008 Horiuchi ................. F16D 55/00
188/1.11 E

FOREIGN PATENT DOCUMENTS

DE  102017211738 A1    3/2018
DE  102016221969 A1 *  5/2018 ........... F16D 65/123
(Continued)

OTHER PUBLICATIONS

European Patent Office, International Search Report, issued in PCT/IB2020/062288, Apr. 13, 2021, Rijswijk, NL.

*Primary Examiner* — Vishal R Sahni
(74) *Attorney, Agent, or Firm* — Marshall & Melhorn, LLC

(57) ABSTRACT

A detection device for detecting a braking force applied by a brake caliper on a hub holder is configured to be mounted at a fastening interface between the brake caliper and the hub holder and has a low-friction body, a caliper-hub-holder connection element, a sensor element, and an electrical interface. The low-friction body puts into contact the brake caliper and the hub holder at the fixing interface. The caliper-hub-holder connection element, configured to be mechanically connected to the brake caliper and the hub holder, is susceptible of deformation. The low-friction body decouples tightening forces from the braking forces to minimize the effect of the tightening forces on the detection device. The sensor element detects strains and generates electrical signals indicative of detected strains and representative of the braking force. The electrical interface is connected to the sensor element for conducting and making (Continued)

available the generated electrical signals. A method and a system for determining a braking torque are also provided.

24 Claims, 6 Drawing Sheets

(51) Int. Cl.
*B60T 17/22* (2006.01)
*F16D 55/00* (2006.01)
*F16D 66/00* (2006.01)

(56) References Cited

FOREIGN PATENT DOCUMENTS

| | | | | |
|---|---|---|---|---|
| DE | 102018122013 A1 * | 3/2020 | ............ | F16D 65/12 |
| EP | 1589328 A1 | 10/2005 | | |
| IT | 201900008865 A1 * | 12/2020 | | |
| WO | WO-2020052953 A1 * | 3/2020 | ............ | F16D 65/12 |

* cited by examiner

SYSTEM AND METHOD FOR DETERMINING A BRAKING TORQUE BY MEANS OF A FORCE DETECTION DEVICE AT AN INTERFACE BETWEEN A BRAKE CALIPER BODY AND A HUB HOLDER

CROSS-REFERENCE TO RELATED APPLICATIONS

This application is a National Phase Application of PCT International Application No. PCT/IB2020/062288, having an International Filing Date of Dec. 21, 2020 which claims priority to Italian Application No. 102019000025372 filed Dec. 23, 2019, each of which is hereby incorporated by reference in its entirety.

FIELD OF THE INVENTION

The present invention relates to a device for detecting a braking force, adapted to be mounted at a fixing interface between a brake caliper and the respective hub holder.

The present invention further relates to a braking torque measurement system which uses the aforementioned device and a method thereof.

The invention further relates to a brake caliper assembly equipped with at least one of the aforesaid devices.

Prior Art

For controlling, monitoring and actuating a braking system, e.g., an electronically controlled disc brake system, it is very useful to know, in real-time and as accurately as possible, the braking force or torque value applied by the brake calipers of the braking system during a braking action.

However, it is difficult to measure the braking force and/or torque applied by the brake calipers of the brake system directly, in an accurate and reliable manner.

In this regard, there is a tendency in the prior art to determine the braking torque and/or force based on indirect measurements, which refer to quantities closely related to the braking torque and/or force, for example, forces acting at different points of the brake caliper.

On the other hand, it is necessary to consider the additional need to use sensor devices as miniaturized and compact as possible, so that they can be easily integrated into the braking system without causing functional problems.

Some compact sensor devices, capable of detecting and/or measuring the lateral (shear) forces acting between the brake caliper support and the hub of the vehicle using strain sensors, are known in this regard.

Various types of sensors, which are interposed between the caliper and the hub holder, and exploit different force or strain or stress sensor technologies, are known in the literature.

Cylindrical (i.e., "washer-shaped") sensors are also known to provide information about the braking torque starting from the deformations induced by the frictional forces which are generated at the interface between the caliper and the hub holder. These concepts cannot disregard the presence of a screw, the pull of which is aimed at generating the friction forces which, in service, are indispensable to counteract the tangential stresses due to braking.

However, the results provided by such devices are heavily conditioned by the tightening torque of the screw used to fix the two components between which the forces are measured. In other words, the result is heavily dependent on axial forces, which constitute a disturbance relative to the accuracy of the estimate of the braking force and/or torque.

In light of the above, the need is strongly felt to devise devices to detect more accurately the force discharged by the brake caliper on the hub holder due to a braking action, minimizing the effect of the tightening force on the result.

The need is also strongly felt for devices and methods for determining the braking torque and/or force with greater accuracy by means of measurements performed at the interface between the brake caliper body and the brake caliper support, or hub holder.

For this application, additional requirements for the measuring device are compactness, robustness, ease of installation (e.g., using the fixing systems already provided for fixing the brake caliper), and versatility of use in the context of fixed or floating caliper disc brakes.

As noted above, the requirements mentioned above are not fully met by the solutions currently available from the prior art.

Solution

It is the object of the present invention to provide a braking force detection device which can at least in part solve the drawbacks described above with reference to the prior art and respond to the aforesaid needs particularly felt in the technical sector considered.

These and other objects are achieved by a detection device as described and claimed herein.

Some advantageous embodiments of the detection device are also described.

It is a further object of the present invention to provide a corresponding braking torque measurement system, configured to determine a braking torque resulting from the implementation of a vehicle braking system, and employing said device.

This object is achieved by a braking torque measurement system as described and claimed herein.

Some advantageous embodiments of such braking torque measurement system are also described.

It is a further object the present invention to provide a brake caliper assembly for a vehicle braking system provided with at least one of the aforesaid detection devices.

These and other objects are achieved by a brake caliper assembly as described and claimed herein.

An advantageous embodiment of such brake caliper assembly is also described.

It is a further object of the present invention to provide a vehicle braking system comprising a plurality of brake caliper assemblies.

These and other objects are achieved by a vehicle braking system as described and claimed herein.

Finally, it is an object of the present invention to provide a method for measuring a braking torque, configured to determine a braking torque resulting from the actuation of a braking system for a vehicle, by means of a detection carried out at at least one fixing interface between a brake caliper and a respective hub holder or support 20.

These and other objects are achieved by a method as described and claimed herein.

Some advantageous embodiments of such method are also described.

BRIEF DESCRIPTION OF THE DRAWINGS

Further features and advantages of the device, system, and method according to the invention will be apparent from the following description of its preferred embodiments, given by way of non-limiting examples, with reference to the accompanying figures, in which.

DETAILED DESCRIPTION OF THE INVENTION

Figure 1:
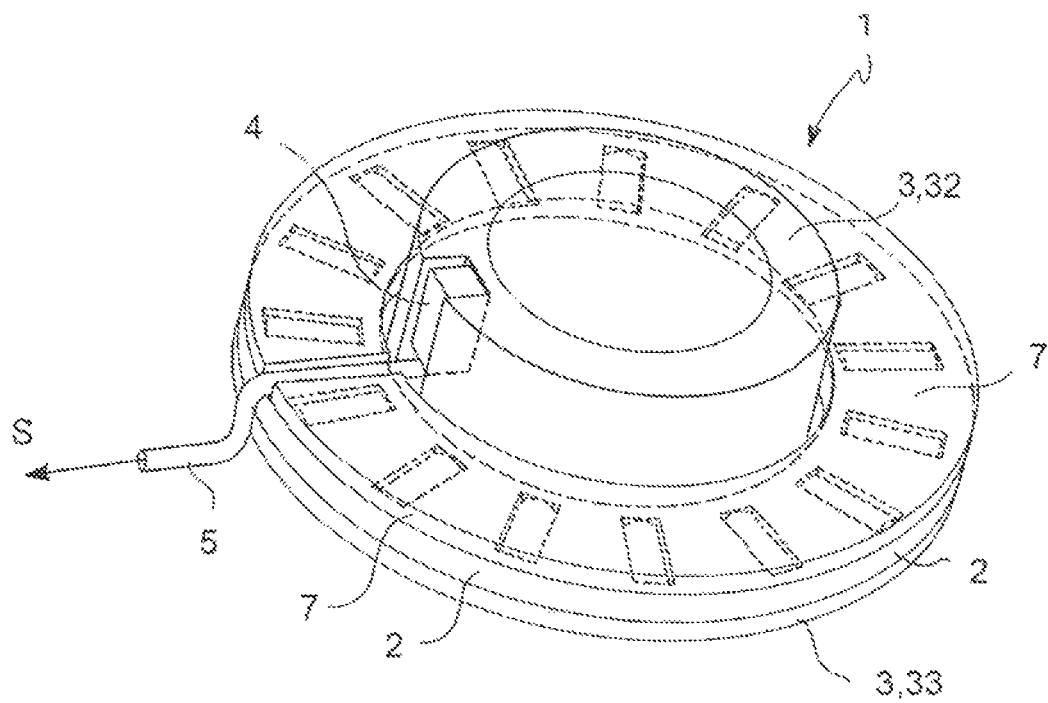
FIG. 1 shows a perspective view of a braking force detection device, according to an embodiment of the present invention.
Figure 2:
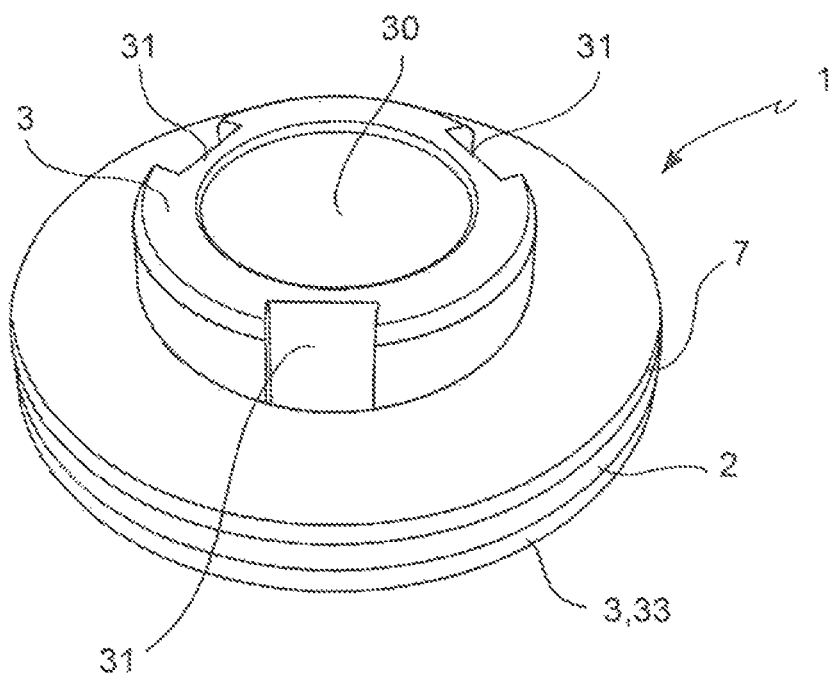
FIG. 2 shows a perspective view of a further embodiment of the device according to the present invention.

A detection device 1 for detecting a braking force deriving from a braking event, applied by a brake caliper 10 on a hub holder or brake caliper support 20, upon and due to a braking event, is described with reference to FIGS. 1-7.

Such a detection device 1 is adapted to be mounted at a fixing or fastening interface (i, ii) between the brake caliper 10 and the hub holder or brake caliper support 20, by tightening means 60 which apply a tightening force.

The device 1 comprises a low-friction body 2, a caliper-hub-holder element 3 and, furthermore, at least one sensor element 4 and an electrical interface 5.

The low-friction body 2 is shaped as a washer or plate or bearing.

The caliper-hub-holder connection element 3 is connected to, and integral with the aforesaid low-friction body.

Furthermore, the caliper-hub-holder connection element 3 is adapted to be mechanically connected, when the detection device 1 is mounted at the fixing interface (i, ii), both to the brake caliper 10 and to the hub holder or brake caliper support 20, to result in a mechanical connection through which the aforesaid braking force is at least partially discharged, from the brake caliper 10 to the hub holder or brake caliper support 20.

The caliper-hub-holder connection element 3 is susceptible to deformation so that the deformations and/or strains locally present in the caliper-hub-holder connection element 3 depend on the overall force acting on the caliper-hub-holder connection element 3.

The aforesaid low-friction body 2 is configured to decouple the tightening forces (generated by the tightening means, e.g., screws) from the braking forces to minimize the effect of the tightening forces on the detection device 1, so that the aforesaid deformations and/or strains present in the caliper-hub-holder connection element 3 are representative of the braking force deriving from the braking event applied by the brake caliper 10 on the hub holder or brake caliper support 20 by means of the caliper-hub-holder connection element 3.

The at least one sensor element 4 is operatively connected to the caliper-hub-holder connection element 3 and is configured to detect a deformation and/or strain present in the caliper-hub-holder connection element 3 and generate at least one electrical signal S indicative of the detected deformation and/or strain and representative of the braking force.

The electrical interface 5 is connected to the aforesaid sensor element 4 for conducting and making available said at least one generated electrical signal S.

According to an implementation option of the device, the aforesaid low-friction body 2 comprises a bearing.

According to a particular implementation option, such a bearing is a sliding bearing.

According to another implementation option, such a bearing is an axial thrust, ball or roller bearing.

According to another implementation option of the device, the aforesaid low-friction body 2 comprises a layer of low-friction polymeric material or a different anti-friction element formed by a material having a low friction coefficient.

According to another implementation option, the low-friction body 2 comprises an element made of a metal and/or ceramic and/or polymer material, to which a low-friction-coefficient coating is applied.

According to various possible implementation examples, the low-friction body 2 comprises a substantially discoidal or washer-shaped plate.

According to another implementation option of the device, the aforesaid low-friction body 2 comprises a metal washer coated with a low-friction material.

According to various possible implementation examples, the washer is made of steel or aluminum or titanium or cast iron.

According to various possible implementation examples, the anti-friction coating is generally made of DLC (Diamond-Like-Carbon), TIN, PTFE, WC, TiCN, CrN, ZrN, PLC, CL, or other anti-friction materials.

It is worth noting that the function of the anti-friction element is to ensure that the physical connection between the caliper and the hub holder is as free as possible from interface friction forces.

In other words, the purpose of the low-friction element is to decouple the load (or the force) resulting from the tightening of the caliper fixing screws from the load (or the force) resulting from the braking torque. In this manner, the caliper is free to move tangentially under torque thereby loading the caliper-hub connection element 3, in which the detection element or sensor element 4 is housed.

Thus, in this case, the brake caliper 10 is connected to the hub holder 20 (or, to the brake caliper support 20) either by the usual and necessary tightening means (e.g., screws) or by the connecting element 3 or bushing 32.

It is worth noting that, in this fastening method, the tightening means, e.g. the screws, have the function of generating on the caliper only a translation constraint in the axial direction, while it is the task of the caliper-hub-holder connection element 3 to generate the translation constraints in the plane passing through the caliper-hub contact surface and rotation surface.

Inter alia, this makes it possible, if desired, to reduce the size of the screws, the function of which, as noted above, no longer comprises the generation (by axial load) of the friction force on the caliper/hub-holder contact surfaces necessary to counteract the force generated during the braking action.

The caliper-hub holder connection element 3 thus transfers at least partially, or entirely, the braking force, i.e., the load due to the braking torque which is transmitted to the hub holder 20. In other words, such a caliper-hub-holder connection element 3 may also be referred to as a "load element" or "a carrier element".

Figure 3:
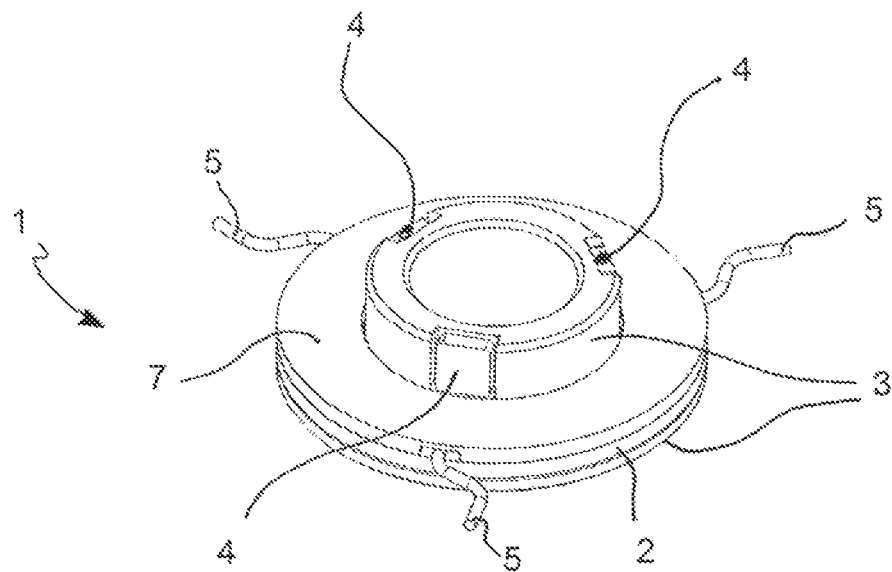
FIG. 3 shows a perspective view of an exploded view of a further embodiment of the device.
Figure 3:
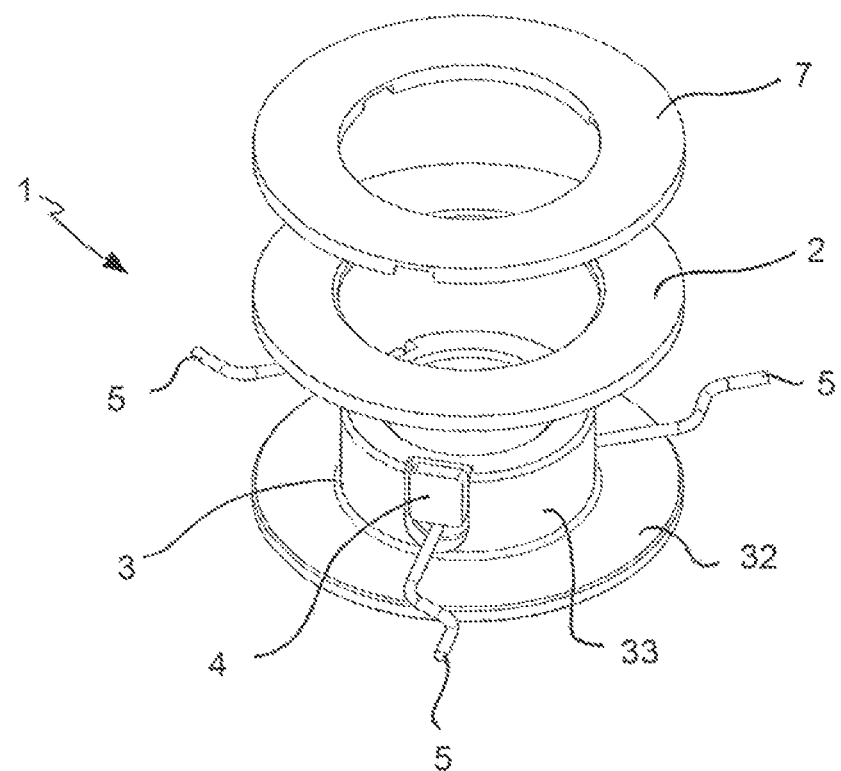
Figure 4:
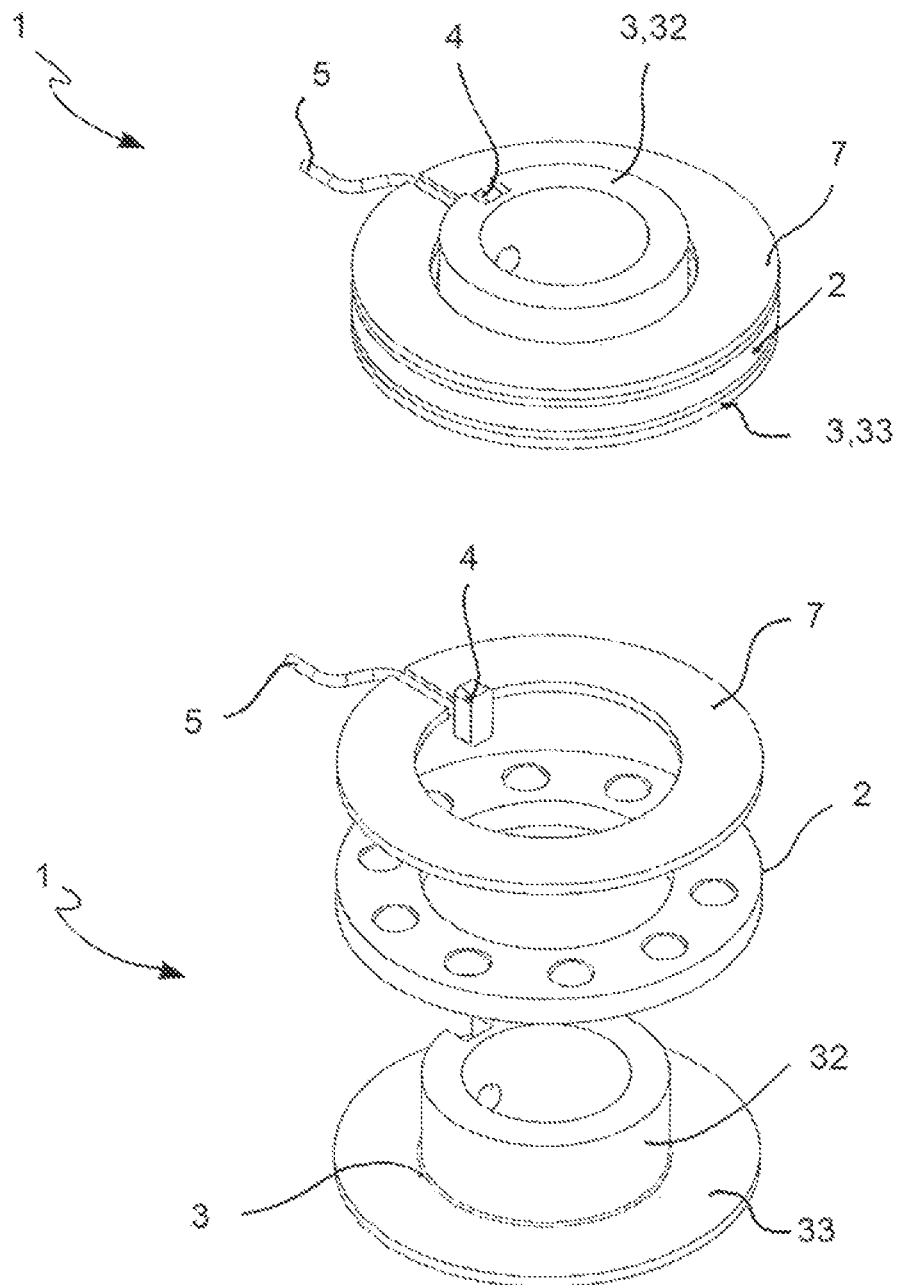
FIG. 4 shows a perspective view of an exploded view of a further embodiment of the device.
Figure 5:
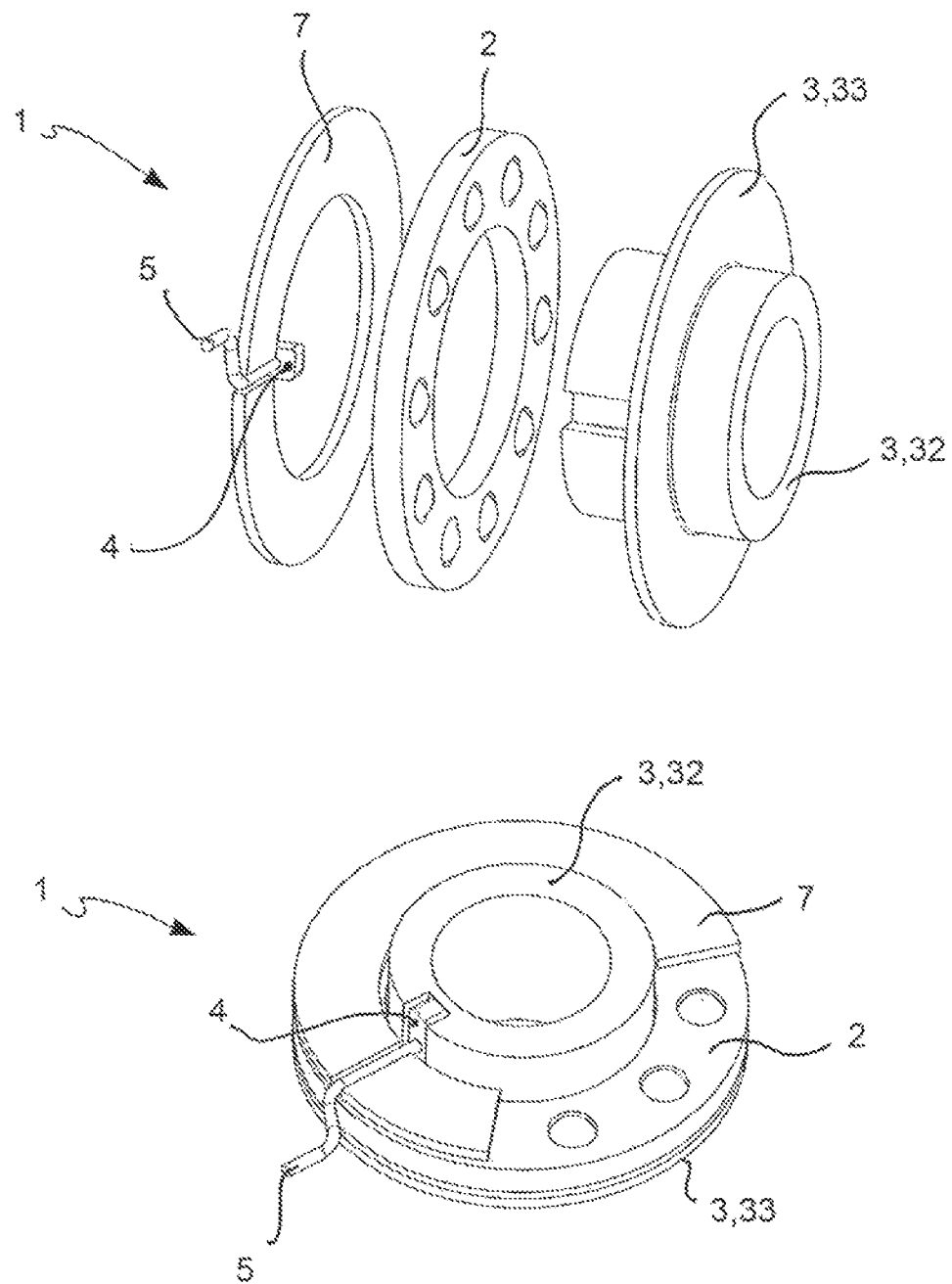
FIG. 5 shows a perspective view of an exploded view of a further embodiment of the device.

According to an embodiment of the detection device 1 (described in particular in the implementation options shown in FIGS. 3-5), the caliper-hub-holder connection element 3 comprises a bushing 32 and a discoidal annular plate 33.

In the examples shown in FIGS. 3 and 4, the annular discoidal plate is a discoidal crown base or flange located at one end of the caliper-hub-holder connection element 3, at the end of the device 1 intended to be in contact with the brake caliper, when the device is mounted.

In the example shown in FIG. 5, the annular discoidal plate is arranged at a portion of the mouth other than the two ends.

According to an embodiment (shown in FIGS. 1-5, and in particular, in greater detail, in FIGS. 3-5), the detection device 1 further comprises a shimming washer 7 configured to adapt the thickness of the detection device 1 to dimensional and/or functional requirements of the fixing interface (i, ii).

In such a case, the aforementioned shimming washer 7 may perform the additional function of protecting the anti-friction element; for example, if the anti-friction element is made by means of a bearing resting on an aluminum surface, the shimming washer 7 prevents the aluminum surface on which the bearing rollers rest from being etched.

According to an embodiment of the device (shown in FIGS. 1-5, and in particular, in greater detail, in FIGS. 3-5), the aforesaid low-friction body comprises a low-friction element 2 interposed in contact between the discoidal annular plate 33 of the caliper-hub-holder connection element 3 and the shimming washer 7.

The discoidal annular plate 33 is adapted to be arranged in close friction contact with a surface of the brake caliper 10 and the shimming washer 7 is adapted to be arranged in close friction contact with a surface of the hub-holder or brake caliper support 20, when the detection device 1 is mounted at the fixing interface (i, ii).

It is worth noting that the lower the friction between the caliper-hub-holder connection element 3 and the shimming washer 7 is, the higher the percentage of braking force which reaches the sensor element. In other words, the efficiency of the measuring system increases as the friction coefficient decreases.

According to an implementation option, the bushing 32 is a steel bushing adapted to be inserted in the hub-holder 20.

According to an implementation option, the aforesaid bushing 32 comprises a recess 30 configured to accommodate a portion of the aforesaid tightening means 60 when the detection device 1 is mounted at the fixing interface (i, ii).

According to an implementation option, the bushing 32 defines a tubular passage adapted to be traversed by the cylindrical thread of a respective screw, when the detection device 1 is mounted at the fixing interface (i, ii).

According to an implementation option, the bushing 32 comprises at least one housing 31 configured to house a respective at least one sensor element 4. Such a housing 31 is arranged in a respective detection position corresponding to a highly deformable bushing portion.

Indeed, the connection guaranteed by the bushing 32, in service, is characterized by constant load large zones, which make it easy to identify the areas in which the sensitive elements must be installed.

The size and positioning of the housings 31, and of the respective sensor elements 4, is determined by means of tests and experiments, to ensure that the sensor element 4 is subjected to stresses such to optimize its functionality, i.e., biases which are neither too low to impair the measurement accuracy nor too high to damage the sensor itself in overload conditions.

According to an implementation option, the bushing 32 is adapted to be mounted in close contact with both the brake caliper and the hub holder, thus resulting in a clearance-free coupling.

In this case, when the brake caliper is subjected to the load generated during the braking event, it transfers such a load to the bushing by direct contact, and the bushing, in turn, transfers such a load to the hub holder by direct contact. The latter contact locally deforms the bushing where the sensor element 4 is located.

According to an implementation option, the bushing 32 is adapted to be coupled with a slight clearance both on the side of the brake caliper 10 and on the side of the hub holder 20, when the detection device 1 is mounted at the fixing interface (i, ii).

The aforementioned clearances are intended to facilitate assembly.

For the rest, from the functional point of view, the behavior is similar to that already described for the case in which there is no clearance; when the brake caliper is subjected to the load generated during the braking event, it "leans" on the bushing, transferring the load to it, and the bushing, in turn, "leans" on the hub holder, transferring the load to it. The latter contact locally deforms the bushing where the sensor element 4 is located.

It is worth noting that, in different portions of the bushing, there may be different deformations and/or consequent different strains, that are thus local, however all depending in some manner on the applied load, which in turn depends on the braking torque.

It is worth noting that the bushing 32 is designed so that, for foreseeable stress levels, the experienced strains remain in the elastic range and thus are not permanent.

Advantageously, the sensor element 4 is placed in a detecting position corresponding to a portion in which the effect of the force or load causes high deformation.

According to an embodiment of the device 1, the aforesaid sensor element 4 is a deformation or strain sensor 4.

Even in this case, it is still possible to trace back from the deformation to the strain, according to relationships known in themselves, or experimentally obtainable for a specific bushing.

According to an implementation option, the strain sensor 4 is a strain gauge, e.g., a rosette or unidirectional strain gauge known in itself.

According to other possible implementation options, the aforesaid sensor element 4 is a mechanical or optical or acoustic or pneumatic or electrical strain gage.

According to various particular implementation examples, the sensor element 4 is a fiber optic strain sensor, or a piezoresistive sensor, or a resonator sensor on silicon, or an inductive transducer.

According to other implementation options, the sensor element 4 may comprise any type of sensor, known in itself, capable of reading/detecting strains or deformations.

According to another implementation option, the sensor element 4 comprises a force sensor.

According to an embodiment of the device, the caliper-hub-holder connection element 3 and the low-friction body 2 are integrated into a single element.

According to an implementation option, the low-friction body comprises an anti-friction coating arranged on the discoidal annular plate 33 of the caliper-hub-holder connection element 3.

According to an embodiment (shown, for example, in FIGS. 1 4 and 5), the detection device 1 comprises a single sensor element 4.

According to an embodiment, the detection device 1 comprises a plurality of sensor elements 4.

According to another embodiment (e.g., shown in FIGS. 2 and 3), the detection device 1 comprises three sensor elements 4.

For example, each bushing may have three strain gauges mounted at 120°.

Again with reference to FIGS. 1-7, a system for measuring a braking torque is described, configured to determine a braking torque resulting from the actuation of a braking system for a vehicle, by means of a detection carried out at at least one fixing interface (i, ii) between a brake caliper 10 and a respective hub-holder or support 20.

Figure 6:
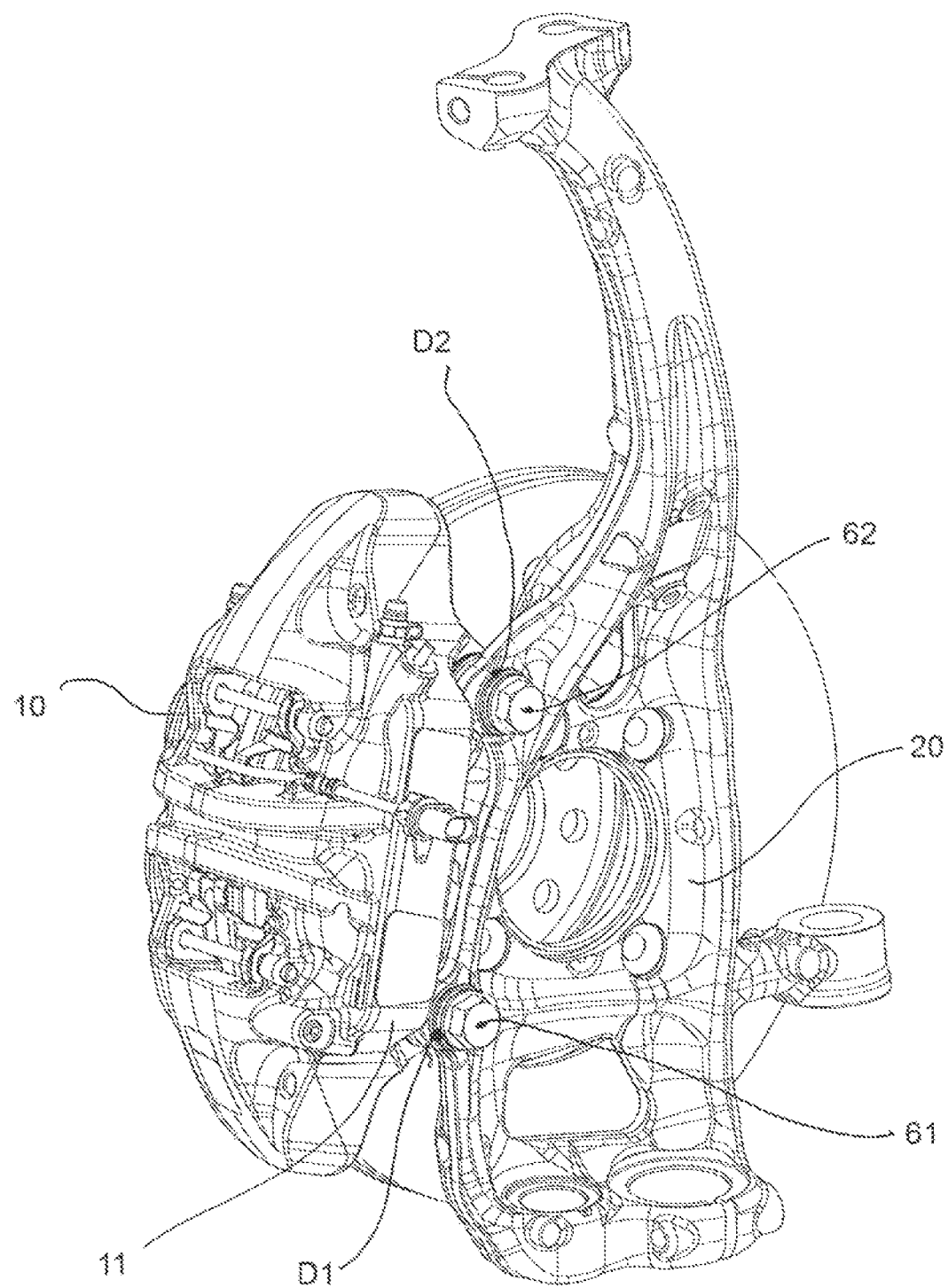
FIGS. 6 and 7 show respective manners of inserting a device according to one of FIGS. 1-5 into a brake caliper assembly according to the present invention.
Figure 7:
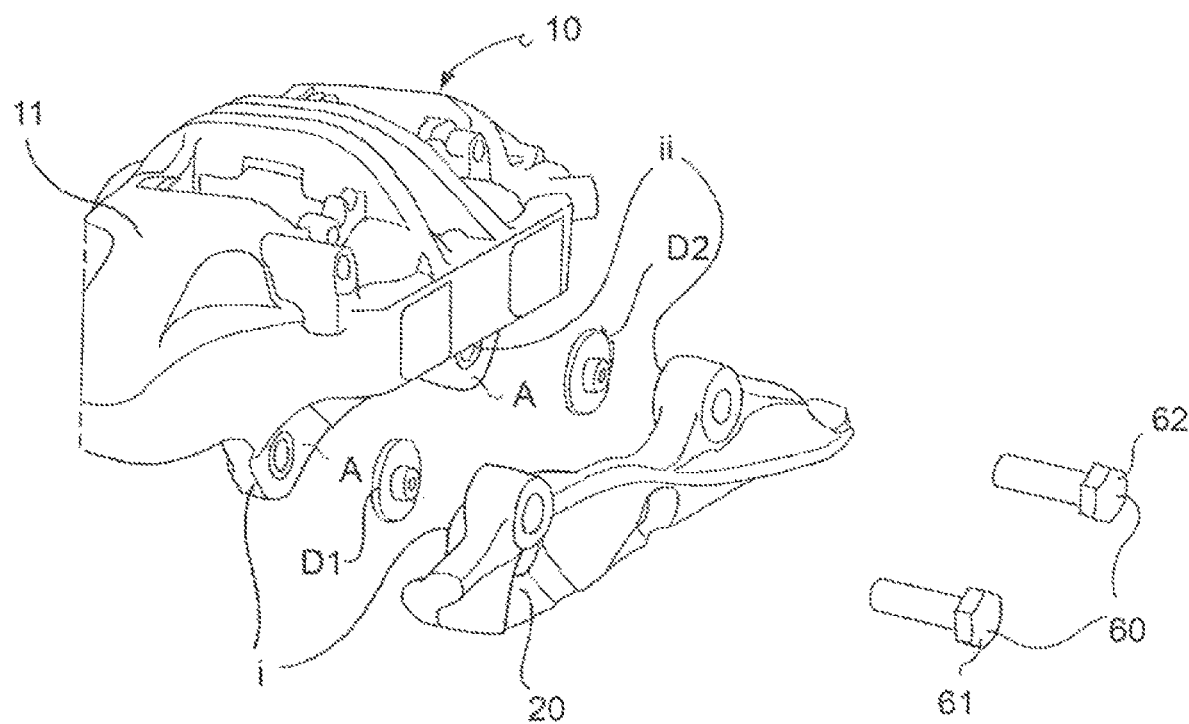

The braking torque measuring system comprises at least one detection device 1 (indicated in FIGS. 3 and 4 also as D1 or D2) according to any one of the embodiments described above, pressed between the brake caliper body 11 of the brake caliper 10 and the hub holder or brake caliper support 20, at a respective at least one fixing interface (i, ii). Such an arrangement is shown in FIGS. 6 and 7.

The braking torque measuring system further comprises tightening means 60 configured to tighten the brake caliper 10 and the hub holder or brake caliper support 20, and press the detection device 1 between the brake caliper body 11 of the brake caliper 10 and the hub holder or brake caliper support 20.

The braking torque measuring system further comprises electronic processing means, operatively connected to the aforesaid electrical interface 5 to receive the aforesaid at least one electrical signal S.

The electronic processing means are configured to determine the braking torque based on the aforesaid at least one electrical signal S representative of the braking force acting on the respective detection device.

According to an embodiment, the braking torque measuring system comprises a plurality of detection devices D1, D2, each at a respective fixing interface (i, ii).

In such a case, the electronic processing means are configured to determine the braking torque based on a plurality of electrical signals S, each from a respective detection device D1, D2.

According to an implementation option, shown in FIGS. 3 and 4, the brake torque measuring system comprises a first detection device D1 at a first fixing interface (i) between a first caliper body portion and a first portion of the hub holder or brake caliper support; and further comprises a second detection device D2 at a second fixing interface (ii) between a second caliper body portion and a second portion of the hub holder or brake caliper support.

According to an embodiment of the braking torque measuring system, the electronic processing means comprise a control unit and/or a processor configured to calculate the braking torque, by means of one or more algorithms executed by one or more software programs, based on said at least one electrical signal S.

According to an implementation option, the system comprises a plurality of detection devices, the electronic processing means calculate the braking torque, by means of one or more algorithms executed by one or more software programs, based on the respective plurality of electrical signals S.

According to various implementation options of the system, the electronic processing means (also definable as "acquisition system") are configured to determine the braking torque, based on the electrical signals S representative of detected deformation and/or detected strain and/or a detected force, through the algorithms and/or procedures which will be described below illustrating the method according to the invention.

The use of more than one detection device and/or the use of more than one sensor element for each device, through algorithms executed by one or more software programs, advantageously makes it possible to discriminate the operating conditions of the vehicle (e.g. forward/reverse gear).

According to an embodiment of the braking torque measurement system, the tightening means 60 include at least one screw 61, 62, comprising a screw anti-friction element disposed below the screw head.

In this manner, the force transmitted by the screw underhead, due to the braking torque, is also canceled out and all the force generated by the braking torque passes through the connection component 3, and through the sensor element 4 is read and converted into a torque reading.

A brake caliper assembly for a vehicle brake system is now described, with reference to FIGS. 6 and 7, comprising a brake caliper 10, a brake caliper hub-holder or support 20, and at least one detection device 1 according to any one of the previously illustrated embodiments, and tightening means 60 configured to tighten the brake caliper 10 and the brake caliper hub-holder or support 20, and to press the detection device 1 between the brake caliper body 11 of the brake caliper 10 and the brake caliper hub-holder or support 20.

The at least one detection device 1 is pressed between the brake caliper body 11 of the brake caliper 10 and the hub holder or brake caliper support 20, at a respective at least one fixing interface (i, ii).

According to an embodiment, the brake caliper assembly comprises: a first detection device D1 fixed between the brake caliper body 11 of the brake caliper 10 and the hub holder or brake caliper support 20, at a first fixing interface i, by means of a first fixing bolt 61; and further comprises a second detection device D2 fixed between the brake caliper body 11 of the brake caliper 10 and the hub holder or brake caliper support 20, at a second fixing interface ii, by means of a second fixing bolt 62.

According to different possible implementation options, the brake caliper is a disc brake caliper, either fixed or floating, or a caliper with radial and axial connections, or monobloc or floating caliper.

The invention comprises a vehicle braking system, comprising a plurality of brake caliper assemblies according to any one of the embodiments described above.

The invention further comprises a braking system for a vehicle, comprising a braking torque measuring system according to any one of the embodiments described above.

Hereafter, a method is described for determining a braking torque resulting from the actuation of a braking system for a vehicle by means of a detection carried out at at least one fixing interface (i, ii) between a brake caliper 10 and a respective hub holder or support 20.

The method firstly comprises the step of inserting at least one detection device 1 (D1, D2 in FIGS. 6 and 7), according to any one of the embodiments described above, at the aforesaid at least one fixing interface, so that the detection device 1 is fixed and pressed between the brake caliper body 11 of the brake caliper 10 and the hub holder or brake caliper support 20, at a respective at least one fixing interface.

The method then provides detecting a braking force, applied by a brake caliper 10 on a hub holder or brake caliper support 20 by means of each of the aforesaid at least one detection device 1, upon a braking event and due to the aforesaid braking event, and generating a respective at least one electrical signal S representative of the braking force as detected.

The method further comprises the steps of transmitting the aforesaid at least one electrical signal S to electronic processing means (or acquisition means); and processing the aforesaid at least one electrical signal S, by the electronic processing means, to determine the braking torque.

According to an embodiment of the method, the step of inserting comprises inserting a plurality of detection devices D1, D2, each at a respective fixing interface i, ii, In this case, the step of processing comprises determining the braking torque based on a plurality of electrical signals S, each from a respective detection device D1, D2.

According to an embodiment of the method, the step of processing comprises calculating the braking torque by the electronic processing means, by means of one or more algorithms executed by one or more software programs, based on the aforesaid at least one electrical signal S.

According to an implementation option, the aforesaid step of calculating comprises calculating the braking torque by means of predetermined relationships between the braking torque and the braking force represented by computerized models or look-up tables which can be accessed by the electronic processing means.

For example, the aforesaid predetermined relationships are determined through steps of experimentation and/or characterization and/or calibration carried out once at least one detection device 1 has been placed and fixed at a respective fixing interface.

According to another implementation option, the step of calculating comprises calculating the braking torque by means of predetermined non-linear relationships between the braking torque and the deformation and/or strain detected by at least one strain and/or stress sensor 4 in the respective position in which it is arranged in contact with the carrier element.

Such predetermined non-linear relationships are, for example, represented by computerized models or look-up tables stored to be accessible by the electronic processing means.

The aforesaid predetermined relationships are determined by means of steps of experimentation and/or characterization and/or calibration carried out once at least one detection device 1 has been placed and fixed at a respective fixing interface.

According to an implementation option, the method comprises detecting the deformations of the loaded connecting element (or bushing) and calculating the strains stresses based on the deformations. The passage from deformations to strains is easily obtainable by virtue of the acquisition instrumentation, i.e., to the electronic processing means, according to relationships either known in themselves or obtained experimentally.

According to an embodiment, the method comprises the further step of testing a braking torque measurement system comprising detection devices provided with multiple sensor elements, then identifying the most stressed sensor element, and finally identifying the respective position as the most suitable position. In such a case, the method then provides for the installation of only one sensor element in the detection device, in the aforementioned most suitable position identified by the tests.

Some further details of the operating principles of the method according to the present invention are hereinafter provided.

A load (e.g., a shear load) is generated on the caliper-hub-holder connection element (i.e., on the carrier element) due to the braking torque.

The term "load" means the forces which are generated during braking, through the friction phenomenon, which are transmitted to the brake caliper (through the pad-caliper interface) and finally are discharged to the hub holder through the mechanical connection caliper-block-hub holder.

It is worth noting that the generated force is not solely tangential but can have both a tangential and a radial component.

With respect thereto, according to an embodiment of the method (and according to a corresponding embodiment of the device), the sensor element is arranged to be aligned with the resultant of the forces.

In other words, the forces resulting from braking are transferred to the brake caliper. The brake caliper transmits them to the bushing. The bushing transmits them to the hub holder. When transferring the load to the hub holder, the bushing deforms locally, in the position where the detection element is arranged (or in the positions where the sensor elements are arranged, if there are more than one).

In this example, the detection element detects the deformations which represent the force applied by the brake caliper on the hub holder (by virtue of the fact that the anti-friction element minimizes and ideally cancels out the effect of the forces generated by the fixing element), which, in turn, are representative of the braking torque (according to a known or experimentally derivable relationship).

Finally, by means of the electronic processing means comprised in the acquisition system, the deformations are transformed into strains, which also represent, at the end, the braking torque.

The system according to the invention, described above, has been appropriately modeled and sized. The theoretical level of accuracy of the measurement was also verified proving that it remains within acceptable limits for medium/high torque values. The behavior at low braking torques was subsequently verified experimentally.

The system was then built and tested on a manually operated tangential bench with known values for pressure and braking torque.

It is worth noting that the object of the present invention is fully achieved by the methods and systems shown above by virtue of the functional and structural features thereof.

The detection device illustrated above is capable of detecting, with good accuracy, the force acting at the fastening interface between the brake caliper and the hub holder, directly dependent on a braking torque caused by a braking event.

Indeed, thanks to its structural and functional characteristics, such a detection device makes the measurement of the deformation or strain, provided by the force acting locally on it, substantially immune and independent from the axial tightening force.

This is because the presence of an anti-friction element makes it possible to decouple the load resulting from the tightening of the caliper fixing screws from the load given by the braking torque.

In other words, the concept of the detection device of the invention exploits a physical connection between the caliper and the hub holder, made through a carrier element comprised in the same device (see below the description of the invention) and freeing itself from interface friction forces.

At the same time, the above-described detection device retains the advantages of the "washer detection devices";

indeed, it can be advantageously and easily inserted between a brake caliper and a brake caliper bracket or a hub holder, using tightening means already provided.

Similar advantages characterize the system and method of measuring the braking torque, which use the aforementioned device.

Indeed, the braking torque measurement system and method achieve more accurate and reliable braking torque results.

This result is achieved by virtue of the fact that such system and method are based on a chain of known deterministic relationships between quantities (braking torque dependent on a force present at the fixing interface, which is dependent, in turn, on the deformation and/or strain detected by the device), wherein the physically detected quantity, i.e., the deformation, substantially depends only on the force applied by the brake caliper on the hub holder and is substantially independent from the tightening force, wherein the force applied by the brake caliper on the hub holder is exactly representative of the braking torque, while the tightening force, not depending on the braking torque, would cause a disturbance to the measurement, which is avoided here (while, not by chance, it is found in the solutions suggested in the prior art).

The person skilled in the art may make many changes and adaptations to the embodiments described above or may replace elements with others, which are functionally equivalent, to satisfy contingent needs without however departing from the scope of the appended claims. All the features described above as belonging to one possible embodiment may be implemented independently from the other described embodiments.

The invention claimed is:

1. A detection device for detecting a braking force, exerted by a brake caliper on a hub holder or brake caliper support, upon a braking event and due to a braking event, said detection device being configured to be mounted at a fixing interface between the brake caliper and the hub holder or brake caliper support, by tightening means exerting a tightening force,
   wherein the detection device comprises:
   a low-friction body, shaped like one of a washer, a plate, and a bearing;
   a caliper-hub-holder connection element, connected to and integral with said low-friction body,
   wherein the caliper-hub-holder connection element is configured to be mechanically connected, when the detection device is mounted at the fixing interface, both to the brake caliper and to the hub holder or brake caliper support, so as to result in a mechanical connection through which said braking force is at least partially discharged from the brake caliper to the hub holder or brake caliper support,
   wherein the caliper-hub-holder connection element is susceptible of deformation, so that deformations and/or strains locally present in the caliper-hub-holder connection element depend on an overall force acting on the caliper-hub-holder connection element,
   wherein said low-friction body is configured to decouple tightening forces from braking forces to minimize an effect of the tightening forces on the detection device so that said deformations and/or strains locally present in the caliper-hub-holder connection element are representative of the braking force exerted by the brake caliper on the hub holder or brake caliper support by the caliper-hub-holder connection element;
   wherein the detection device further comprises:
   at least one sensor element, operatively connected to the caliper-hub-holder connection element, configured to detect a deformation and/or a strain present in the caliper-hub-holder connection element and generate at least one electrical signal indicative of the deformation and/or strain detected, and representative of the braking force; and
   an electrical interface connected to said at least one sensor element for conducting and providing said at least one generated electrical signal.

2. The detection device of claim 1, wherein said low-friction body comprises a sliding bearing or an axial thrust bearing.

3. The detection device of claim 1, wherein said low-friction body comprises a layer of low-friction polymer material, or wherein said low-friction body comprises an element made of at least one of a metal material, a ceramic material, and a polymer material, to which a low-friction coefficient coating is applied.

4. The detection device of claim 1, wherein the caliper-hub-holder connection element comprises a bushing and a discoidal annular plate.

5. The detection device of claim 4, further comprising a shimming washer configured to adapt a thickness of the detection device to dimensional and/or functional needs of the fixing interface.

6. The detection device of claim 5, wherein said low-friction body comprises a low-friction element interposed in contact between said discoidal annular plate of the caliper-hub-holder connection element and said shimming washer, wherein said discoidal annular plate is adapted to be arranged in close friction contact with a surface of the brake caliper and said shimming washer is adapted to be arranged in close friction contact with a surface of the hub holder or brake caliper support, when the detection device is mounted at the fixing interface.

7. The detection device of claim 4, wherein said bushing comprises a recess configured to accommodate a portion of said tightening means when the detection device is mounted at the fixing interface,
   or wherein said bushing comprises at least one housing configured to house a respective at least one sensor element, said housing being arranged in a respective detection position corresponding to a high-deformability bushing portion,
   or wherein said bushing is adapted to be coupled with a slight clearance both on a side of the brake caliper and on a side of the hub holder or brake caliper support, when the detection device is mounted at the fixing interface.

8. The detection device of claim 1, wherein said at least one sensor element is a strain sensor.

9. The detection device of claim 8, wherein the strain sensor is one of a mechanical, optical, acoustic, pneumatic or electrical strain gauge, or one of a fiber-optic strain sensor, a piezo-resistive sensor, an on-silicon resonator sensor, and an inductive transducer.

10. The detection device of claim 1, wherein the caliper-hub-holder connection element and the low-friction body are integrated into a single element.

11. The detection device of claim 6, wherein the low-friction body comprises an anti-friction coating arranged on the discoidal annular plate of the caliper-hub-holder connection element.

12. The detection device of claim 1, comprising only one sensor element, or comprising a plurality of sensor elements.

13. The detection device of claim 1, comprising three sensor elements.

14. A brake caliper assembly for a braking system for a vehicle, comprising:
   a brake caliper;
   a hub holder or brake caliper support;
   at least one detection device according to claim 1, the at least one detection device being pressed between a brake caliper body of the brake caliper and the hub holder or brake caliper support, at a respective at least one fixing interface; and
   tightening means configured to tighten the brake caliper and the hub holder or brake caliper support, and press the detection device between the brake caliper body of the brake caliper and the hub holder or brake caliper support,
   wherein said brake caliper is a fixed caliper or a floating caliper.

15. The brake caliper assembly of claim 14, comprising:
   a first detection device secured between the brake caliper body of the brake caliper and the hub holder or brake caliper support, at a first fixing interface, by a first fixing bolt; and
   a second detection device secured between the brake caliper body of the brake caliper and the hub holder or brake caliper support, at a second fixing interface, by a second fixing bolt.

16. A braking system for a vehicle, comprising a plurality of brake caliper assemblies according to claim 14.

17. A method for determining a braking torque resulting from actuation of a braking system for a vehicle by a detection carried out at at least one fixing interface between a brake caliper and a respective hub holder or brake caliper support,
   the method comprising:
   inserting at least one detection device according to claim 1 at said at least one fixing interface, so that the detection device is fixed and pressed between a brake caliper body of the brake caliper and the hub holder or brake caliper support, at a respective at least one fixing interface;
   detecting a braking force, exerted by the brake caliper on the hub holder or brake caliper support by said at least one detection device, in case of a braking event and due to a braking event, and generating a respective at least one electrical signal representative of detected braking force;
   transmitting said at least one electrical signal to electronic processing means; and
   processing said at least one electrical signal by said electronic processing means to determine the braking torque.

18. The method of claim 17, wherein the inserting step comprises inserting a plurality of detection devices, each at a respective fixing interface, and wherein the processing step comprises determining the braking torque based on a plurality of electrical signals, each from a respective detection device.

19. The method of claim 18, wherein the processing step comprises calculating the braking torque by the electronic processing means, by one or more algorithms executed by one or more software programs, based on said at least one electrical signal,
   wherein the calculating step comprises calculating the braking torque by predetermined relationships between the braking torque and the braking force represented by computerized models or look-up tables accessible by the electronic processing means,
   said predetermined relationships being determined through steps of experimentation, characterization and/or calibration carried out once at least one detection device has been placed and secured at the respective fixing interface.

20. A system for measuring a braking torque resulting from actuation of a braking system for a vehicle, by a detection carried out at at least one fixing interface between a braking caliper and a respective hub holder or brake caliper support,
   wherein the system comprises:
   at least one detection device for detecting a braking force, exerted by a brake caliper on a hub holder or brake caliper support, upon a braking event and due to a braking event, said detection device being configured to be mounted at a fixing interface between the brake caliper and the hub holder or brake caliper support, by tightening means exerting a tightening force, wherein the detection device comprises:
     a low-friction body, shaped like one of a washer, a plate, and a bearing;
     a caliper-hub-holder connection element, connected to and integral with said low-friction body,
     wherein the caliper-hub-holder connection element is configured to be mechanically connected, when the detection device is mounted at the fixing interface, both to the brake caliper and to the hub holder or brake caliper support, so as to result in a mechanical connection through which said braking force is at least partially discharged from the brake caliper to the hub holder or brake caliper support,
     wherein the caliper-hub-holder connection element is susceptible of deformation, so that deformations and/or strains locally present in the caliper-hub-holder connection element depend on an overall force acting on the caliper-hub-holder connection element,
     wherein said low-friction body is configured to decouple tightening forces from braking forces to minimize an effect of the tightening forces on the detection device so that said deformations and/or strains locally present in the caliper-hub-holder connection element are representative of the braking force exerted by the brake caliper on the hub holder or brake caliper support by the caliper-hub-holder connection element;
   wherein the detection device further comprises:
   at least one sensor element, operatively connected to the caliper-hub-holder connection element, configured to detect a deformation and/or a strain present in the caliper-hub-holder connection element and generate at least one electrical signal indicative of the deformation and/or strain detected, and representative of the braking force; and
   an electrical interface connected to said at least one sensor element for conducting and providing said at least one generated electrical signal, the at least one detection device pressed between a brake caliper body of the brake caliper and the hub holder or brake caliper support, at a respective at least one fixing interface;
   tightening means configured to tighten the brake caliper and the hub holder or brake caliper support, and press the detection device between the brake caliper body of the brake caliper and the hub holder or brake caliper support; and electronic processing means, operatively connected to said electrical interface to receive said at least one electrical signal, said electronic processing means being configured to determine the braking torque based on said at least one electrical signal representative of the braking force acting on a respective detection device.

21. The system of claim 20, comprising a plurality of detection devices, each at a respective fixing interface, wherein the electronic processing means are configured to determine the braking torque based on a plurality of electrical signals, each electrical signal coming from a respective detection device.

22. The system of claim 21, comprising:
a first detection device at a first fixing interface between a first caliper body portion and a first portion of the hub holder or brake caliper support; and
a second detection device at a second fixing interface between a second caliper body portion and a second portion of the hub holder or brake caliper support.

23. The system of claim 20, wherein the electronic processing means comprise a control unit and/or a processor configured to calculate the braking torque, by of one or more algorithms executed by one or more software programs, based on said at least one electrical signal, or wherein the tightening means comprise at least one screw, wherein said at least one screw comprises an anti-friction screw element arranged below a head of the screw.

24. A braking system for a vehicle, comprising a system for measuring a braking torque according to claim 21.

* * * * *